(12) United States Patent
Park et al.

(10) Patent No.: US 7,068,848 B2
(45) Date of Patent: Jun. 27, 2006

(54) METHOD OF CODING IMAGE DATA USING REGION OF INTEREST

(75) Inventors: Keun-Hyeong Park, Seoul (KR); Chul-Soo Lee, Daejeon (KR); Hyun-Wook Park, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 634 days.

(21) Appl. No.: 10/112,851

(22) Filed: Mar. 29, 2002

(65) Prior Publication Data

US 2003/0026488 A1    Feb. 6, 2003

(30) Foreign Application Priority Data

May 30, 2001    (KR) ............................... 2001-30007

(51) Int. Cl.
  *G06K 9/36* (2006.01)
(52) U.S. Cl. ..................................... 382/240
(58) Field of Classification Search ................ 382/128, 382/240, 244–248; 375/240.19; 348/398.1, 348/408.1
See application file for complete search history.

(56) References Cited

U.S. PATENT DOCUMENTS 5,764,807 A * 6/1998 Pearlman et al. ........... 382/240
6,134,350 A * 10/2000 Beck .......................... 382/240
6,801,665 B1 * 10/2004 Atsumi et al. .............. 382/240

OTHER PUBLICATIONS

Atsumi et al. ["Lossy/Lossless Regions-of-interest Image Coding Based on Set Partitioning in Hierarchical Trees", IEEE 1998, pp. 87-91].*

* cited by examiner

*Primary Examiner*—Duy M. Dang
(74) *Attorney, Agent, or Firm*—Cantor Colburn LLP

(57) ABSTRACT

A region of interest coding method based on the SPIHT algorithm, in which more bits are allocated with respect to a region of interest to quickly compress and restore an image, is provided. The region of interest coding method is applied to a multiple resolution coding operation. In the coding method, an image is coded using the SPIHT algorithm before a region of interest is set. When a region of interest is defined based on a region of interest mask and a parent mask, coefficients are coded with respect to a bit plane defined by a user, and a compensation coding operation is performed with respect to coefficients not related with the region of interest. The coding operation is performed based on the SPIHT algorithm by the amount of bits permitted in the bit plane of the remaining coefficients. Therefore, it is possible to implement compression and restoration of various images.

17 Claims, 9 Drawing Sheets

(a)

(b)

ONE LIS $TH=2^n$

■ SIGNIFICANT COEFFICIENT
▨ ENTRY OF LIP
▧ ENTRY OF LIS $TH = 2^{n-1}$

FIG. 7 a) Modified Sorting Pass:

a.1) for each entry (i,j) in all the LIP(p) for $n \leq p \leq n_{max}$ do:

if (i,j) is one of the ROI coefficients, do:

a.1.1) output $S_n(i,j)$;

a.1.2) if $S_n(i,j) = 1$, then move (i,j) to the LSP and output the sign of $c_{i,j}$;

a.2) for each entry (i,j) in the LIS(p) for $n \leq p \leq n_{max}$ do:

a.2.1) if the entry is of type A, then if (i,j) is one of the PROI coefficients, do:

output $S_n(D(i,j))$;

if $S_n(D(i,j)) = 1$, then for each $(k,l) \in O(i,j)$ and it belongs to the ROI, do:

output $S_n(k,l)$ if $S_n(k,l) = 1$, then add (k,l) to the LSP and output the sign of $c_{k,l}$;

if $S_n(k,l) = 0$, then add (k,l) to the end of the LIP(n);

if $L(i,j) \neq \emptyset$, then move (i,j) to the end of the LIS(n) as an entry of type B, and goto Step a.2.2); otherwise, remove entry (i,j) from the current LIS(p);

if (k,l) doesn't belong to the ROI coefficients, do:

move (k,l) to the end of the LIP(n);

a.2.2) if the entry is of type B, then if (i, j) is one of the PROI coefficients, do:

output $S_n(L(i,j))$;

if $S_n(L(i,j)) = 1$, then add each $(k,l) \in O(i,j)$ to the end of the LIS(n) as an entry of type A;

remove (i,j) from the LIS(p);

b) Refinement Pass: for each entry (i,j) in the LSP, except those included in the last sorting pass (i.e., with same n), if (i,j) belongs to the ROI coefficients, do:

output the n-th most significant bit of $|c_{i,j}|$;

c) Quantization-Step Upgrade :

decrement n by 1 and go to Step a) if $n \geq R$

METHOD OF CODING IMAGE DATA USING REGION OF INTEREST

BACKGROUND OF THE INVENTION

1. Field of the Invention

The present invention relates to a method of coding image data, and more particularly, to a method of coding image data of region of interest using a SPIHT (Set Partional in Hierarchical Tree) algorithm to facilitate compressing and restoring image data of the region of interest.

2. Description of the Related Art

As computer communication and image communication technique has been developed, still image coding compression and transfer technique has also been developed and employed for the communication technique. JPEG (Joint Photographic Coding Experts Group) is generally used as a standard of still image compression coding method. The conventional JPEG employs a compression method based on DCT (Discrete Cosine Transform).

Recently, as a coding method for compressing image data, a wavelet transform coding method is widely used. Data of a wavelet-transformed image is expressed with wavelet coefficients. Methods for performing a compression coding using the characteristics of the wavelet coefficients includes EZW (Embedded Zero-tree Wavelet), SPIHT, TCQ (Trellis Coded Quantization), etc. In the SPIHT algorithm provided by Said and Pearlman, distortion of a restored image is decreased by transforming image data into wavelet domain and gradually transferring the wavelet coefficients.

In a method for transferring important information first, a coefficient having a larger size is first transferred using the fact that the largest coefficient has the largest information amount. In another method for transferring important information first, a bit plane corresponding to the MSB (Most Significant Bit) is first transferred. The bit plane is gradually transferred based on the sequence of significance by transforming an image into wavelet coefficients and sorting the wavelet coefficients based on the size of the same. The key point of the above algorithm is directed to sorting the wavelet coefficients based on the size and effectively storing the sorted information. A detail description of the algorithm follows.

It is first determined whether a certain coefficient ($C_{i,j}$) is larger than a predetermined threshold value ($2^n$) This is called "significance test". In the significance test, if the coefficient ($C_{i,j}$) is larger than the threshold value ($2^n$), it is defined as a significant pixel. A hierarchical tree structure is introduced for grouping and expressing insignificant coefficients. As shown in FIG. 1, a hierarchical tree structure is generated when dividing an image signal into four bands based on a recursive method.

FIG. 1 is a view illustrating a case that an image signal is twice transformed into wavelet coefficients. The wavelet coefficients are partitioned based on a hierarchical set having a tree structure. Here, the following sets of coordinates are used.

O(i,j): a set of direct descendant coordinates of coordinate (i,j) and has a circle of {(2i,2j), (2i,2j+1), (2i+1,2j), (2i+1,2j+1)} except for a pyramid structure having a highest and/or lowest value.

D(i,j) a set of all descendant coordinates of coordinate (i,j).

L(i,j)=D(i,j)−O(i,j)

As shown in FIG. 1, four direct descendants exist in one coordinate. Mark "X" of the left upper portion represents a coefficient which does not have a descendant among the coefficients in the highest stage. In addition, the SPIHT algorithm manages coordinates of the coefficients using three lists, such as LSP (List of significant pixel), LIP (List of insignificant pixel) and LIS (List of insignificant set). The LIS represents a list of insignificant coefficient set, the LIP represents a list of insignificant coefficients, and LSP represents a list of significant coefficients.

The SPIHT algorithm has two major stages, a sorting pass and a refinement pass. In the sorting pass, a coefficient is compared with a certain threshold value to compute a significant or insignificant value. In the refinement pass, a coefficient value obtained in the sorting pass is refined. The sorting pass includes a node test for testing significance with respect to the coefficients of the LIP, and a descendent test for testing significance with respect to the entry of an LIS. When a coefficient in the LIP passes the significance test, the coefficient is joined in the LSP. When the entry of the LIS passes the significance test, the entry of the same is divided into coefficients and sets smaller than the entry. All coefficients are sorted based on each bit plane using the obtained threshold values.

Input and output occur at each of the above processes. One bit is generated in every significance test. When one coefficient enters the LSP, one bit related to the coding of the coefficient is generated. Namely, when the threshold value is determined, the bits as many as the number of the LIP entries and the number of the LIS entries are generated in the significance tests. In addition, the bits as many as the number of the LSP entries are generated. In addition, the bits as many as the number of the coefficients which enter into the LSP in the determined threshold value are generated.

In order to decrease the amount of the bits generated in the sorting process, the number of the entries of the LIP and LIS should be decreased. The entry of the LIP represents one coefficient, and the entry included in the LIS represents a set of the coefficients. The entry of the LIS includes four coefficients or coefficients as many as the sum of the multiplier of four. When the entry of the LIS is divided, the coefficients can be divided into significant coefficients, insignificant coefficients and a set of insignificant coefficients. In each list, the number of the entries is increased. Therefore, it is possible to decrease the amount of the generated bits by not separating the entries of the LIS.

As a condition for dividing a set of the insignificant coefficients, if a neighboring coefficient is a significant coefficient or if there is a significant coefficient in a descendent level, the coefficients except for the significant coefficients are entered into the LIP or LIS.

The SPIHT algorithm is well disclosed in an article "A new, fast, and efficient image coded based on set partitioning in hierarchical trees," by A. Said and W. A. Pearlman, IEEE Trans, Circuits and Systems for Video Technology, Vol. 6, pp. 243–250, June, 1996."

The coding of region of interest is directed to a method for allocating more bits to a region of interest and transferring information concerning the region of interest first and/or more.

In order to perform coding of region of interest, a region of interest should be first defined. There are two methods for defining a region of interest. In a first method, a region of interest is set in an encoder, and then the region of interest is coded by the encoder. In this case, information concerning the region of interest should be transferred to a decoder. In a second method, after receiving a bit stream transferred from the encoder, a decoder designates a region of interest, and the information of the region of interest is returned to the encoder. Then, the encoder performs a coding operation of the region of interest. In this case, the encoder and the decoder have the information concerning the region of interest. The conventional method for coding the region of interest is shown in FIG. 2.

FIGS. 2A and 2B are views for explaining a conventional region of interest coding method, which show before and after the region of interests is determined, respectively. Here, the horizontal axis represents sorted wavelet coefficients, and the vertical axis represents bit planes of coefficients.

As shown in FIG. 2A, before the region of interest is determined, wavelet coefficients with respect to the entire image are compressed and transferred according to the bit plane. As shown in FIG. 2B, after the region of interest is determined, the coefficients in the region of interest are bit-shifted behind the bit stream compressed with respect to the wavelet coefficients in which the coding is completed before the region of interest is set. The coefficients that are not related to the region of interest are not shifted. Then, the image is entirely coded. The method for compressing the entire image based on the bit shift with respect to the coefficients for the region of interest is well disclosed in an article "Lossy/lossless region-of-interest image coding based on set partitioning in hierarchical trees," by E. Atsumi and N. Farvardin, IEEE International Conference on Image Processing (ICAP-98), Oct. 4~7, 1998 Chicago, Ill., USA."

BRIEF SUMMARY OF INVENTION

The present invention provides a region of interest coding method for implementing quick compression and restoration of image data by using a region of interest mask and a parent mask of a region of interest based on a SPIHT algorithm.

In one aspect of the present invention, there is provided a region of interest coding method for compressing and coding a wavelet-transformed image using a SPIHT algorithm, which includes: (a) compressing wavelet transform coefficients using the SPIHT algorithm at an initial stage; (b) coding and compressing to a bit plane defined by a user with respect to coefficients related to a region of interest and a set of the coefficients when the region of interest is given; (c) performing compensation-coding and compressing with respect to coefficients excluded from the step (b) and a set of the coefficients; and (d) compressing coefficients of the remaining bit plane using the SPIHT algorithm.

BRIEF DESCRIPTION OF DRAWINGS

The present invention will become more apparent by describing exemplary embodiments thereof in more detail with reference to the accompanying drawings in which:

FIG. 7 is a view illustrating an algorithm formed with a similarity code according to the present invention.

DETAILED DESCRIPTION OF INVENTION

Exemplary embodiments of the present invention will be described with reference to the accompanying drawings.

Figure 1:
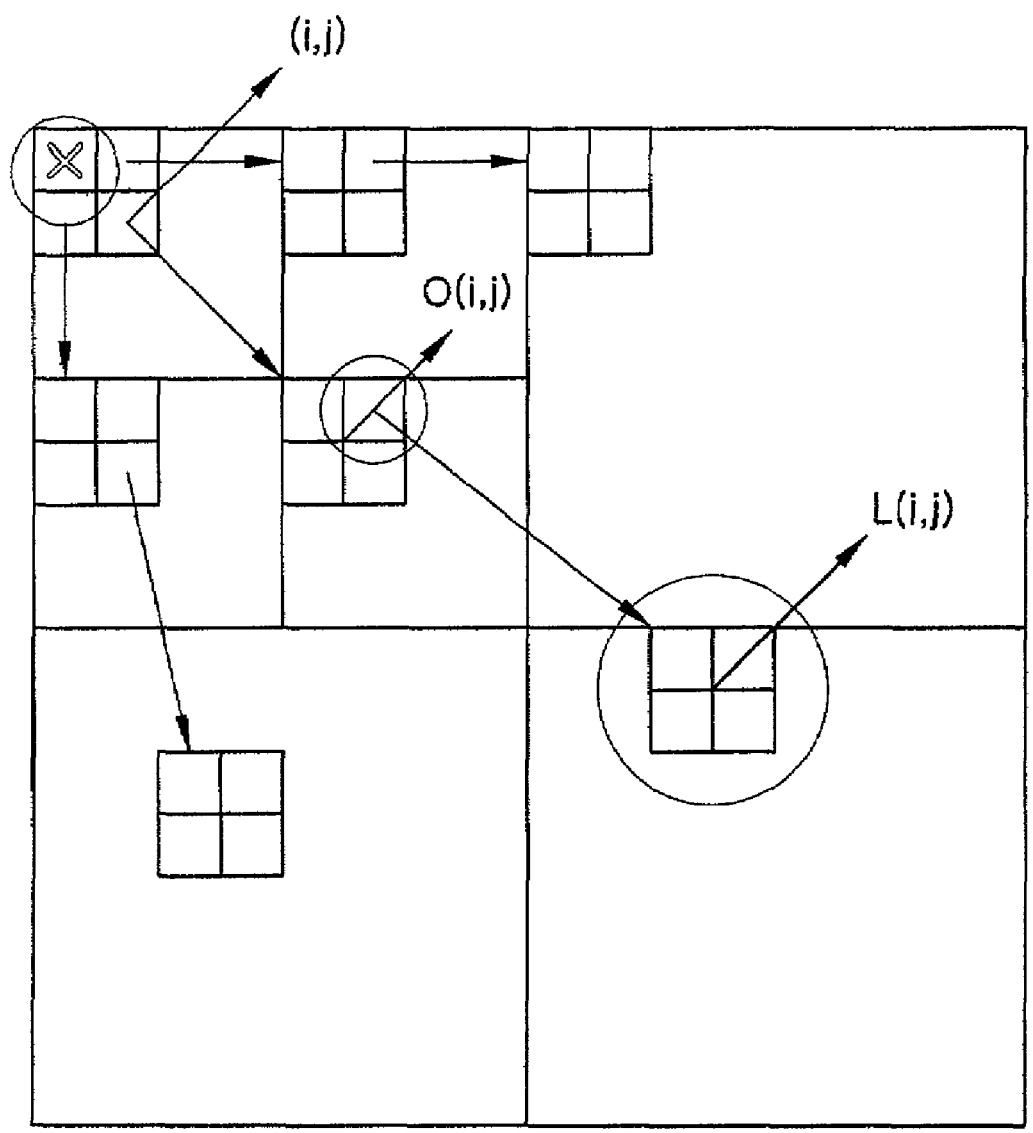
FIG. 1 is a view illustrating a tree structure of wavelet transform coefficients in the conventional art.
Figure 2A:
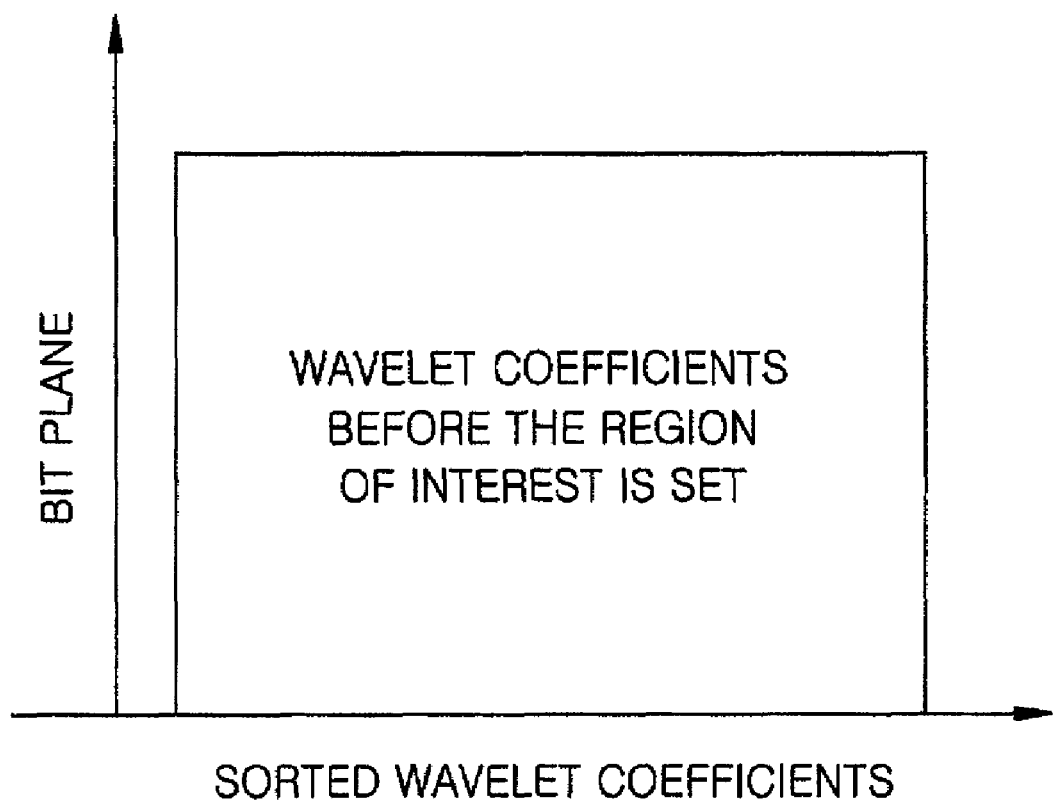
FIGS. 2A and 2B are views for explaining a conventional region of interest coding method.
Figure 2B:
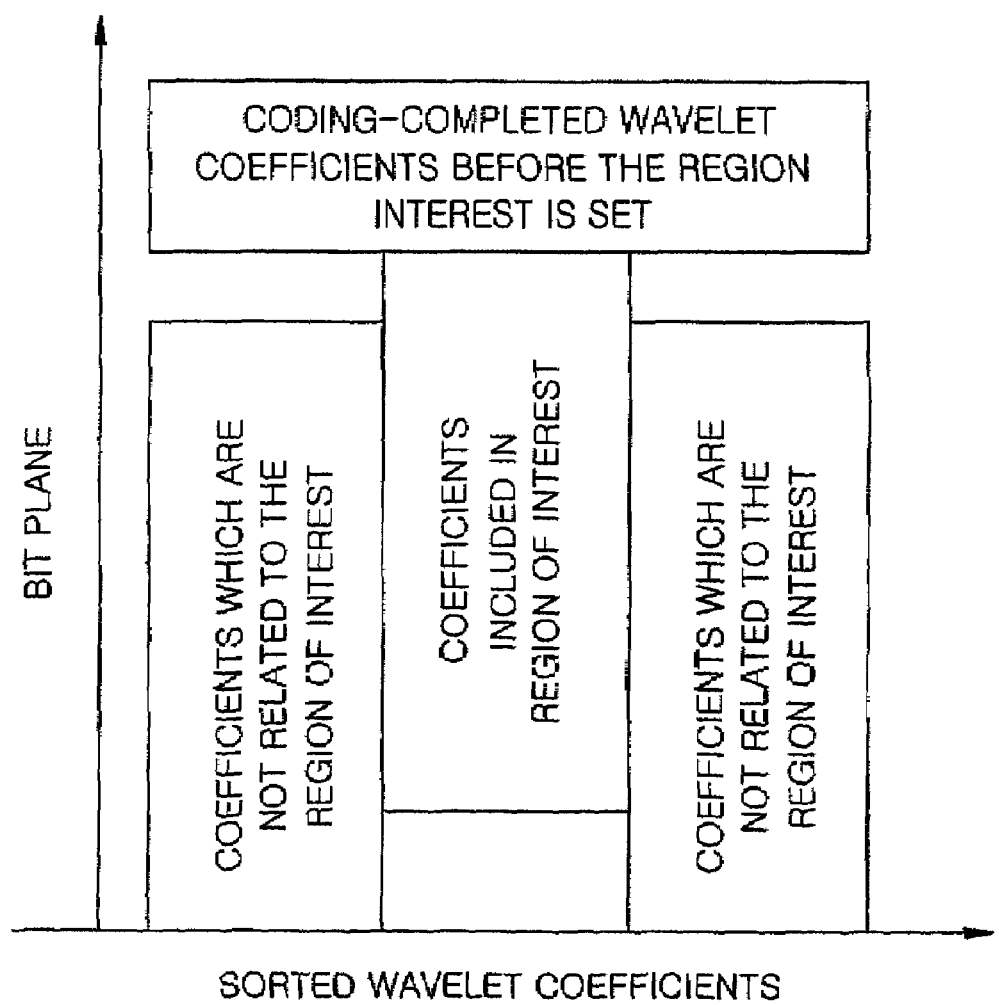
Figure 3:
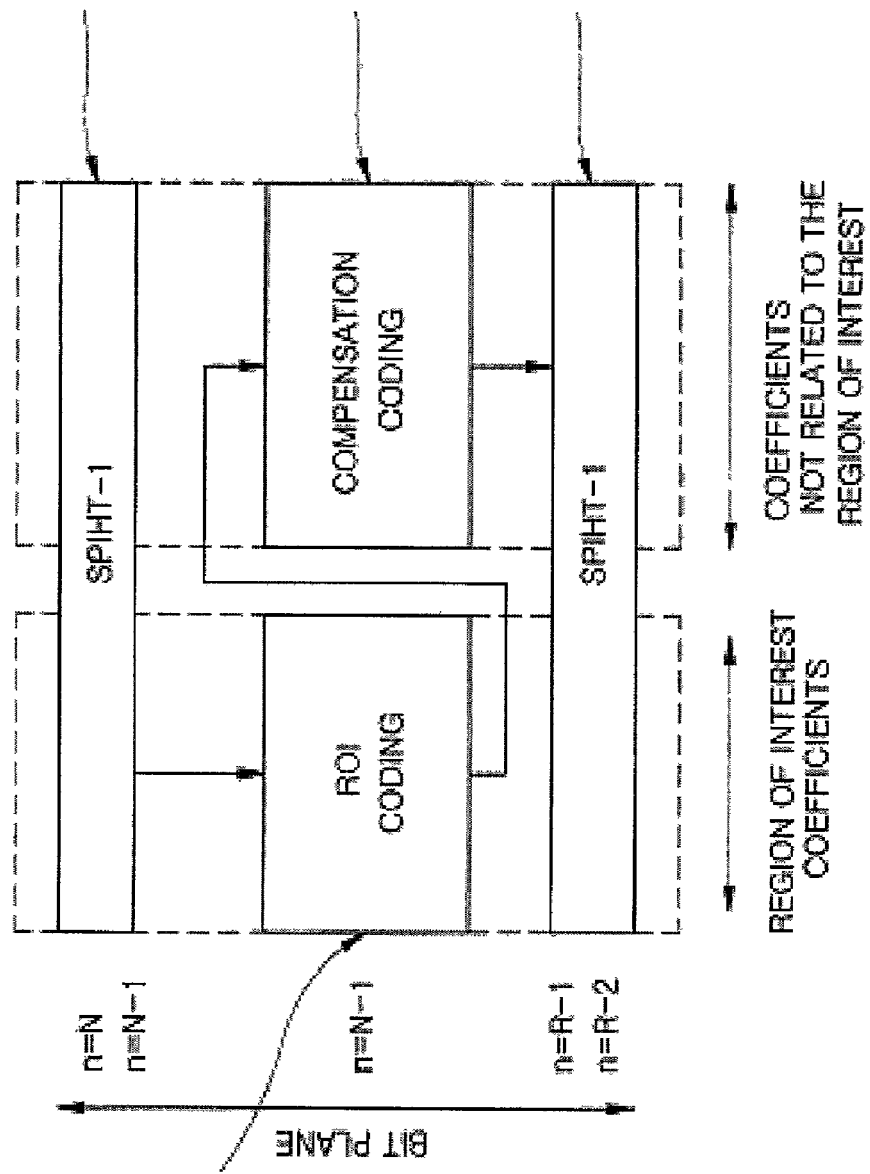
FIG. 3 is a view for explaining a coding method of a region of interest according to the present invention.

FIG. 3 is a view for illustrating a method of coding a region of interest according to the present invention.

As shown therein, wavelet transform coefficients are coded and compressed based on the SPIHT method before a region of interest is set (step 301). In the case that a region of interest is set and the region of interest is provided from a decoder, coefficients related to the region of interest and a set of the coefficients are ROI (region of interest)-coded and compressed to a bit plane (n=R) defined by a user (step 302). The region of interest is compressed to the defined bit plane, and coefficients and a set of the coefficients excluded from the region of interest are compensation-coded and compressed to the defined bit plane (n=R) (step 303). Then, the compression coding is performed with respect to the bit plane of remaining coefficients, namely, from n=R−1, based on the SPIHT algorithm (step 304). Since a higher level bit in a region of non-interest contributes to decreasing distortion of the entire image better than a lower level bit in the region of interest does, the coding operation is performed in the above method.

It is needed to know, after the region of interest is determined, which coefficients are to be used for forming the region of interest in the wavelet region. The position having a coefficient which is not "0" has a coefficient needed for forming a region of interest, when wavelet-decomposition is performed with respect to the region of interest. The above coefficient is defined as a region of interest (ROI) coefficient. A mask which represents position(s) of the region of interest coefficient(s) is defined as a region of interest mask (M). The above definition may be expressed in the following equation.

$$r(u, v) = \begin{cases} 1, \text{ when } (u, v) \in R \\ 0, \text{ when } (u, v) \notin R \end{cases} \quad (1)$$

where R represents a region of interest.

$$M = \{(i, j) \mid m(i, j) = 1\}, \text{ where } m(i, j) = \begin{cases} 1, & d(i, j) \neq 0 \\ 0, & \text{otherwise} \end{cases} \quad (2)$$

where $\{d(i,j)\}$=FDWTN$\{r(u,v)\}$, and FDWTN represents a discrete wavelet transform which is recursively performed to a low frequency band. The region of interest coefficient represents a coefficient in which $m(i,j)=1$. $(i,j)$ represents a coordinate after a wavelet transform, and $(u, v)$ represents a coordinate at an original image.

Figure 4:
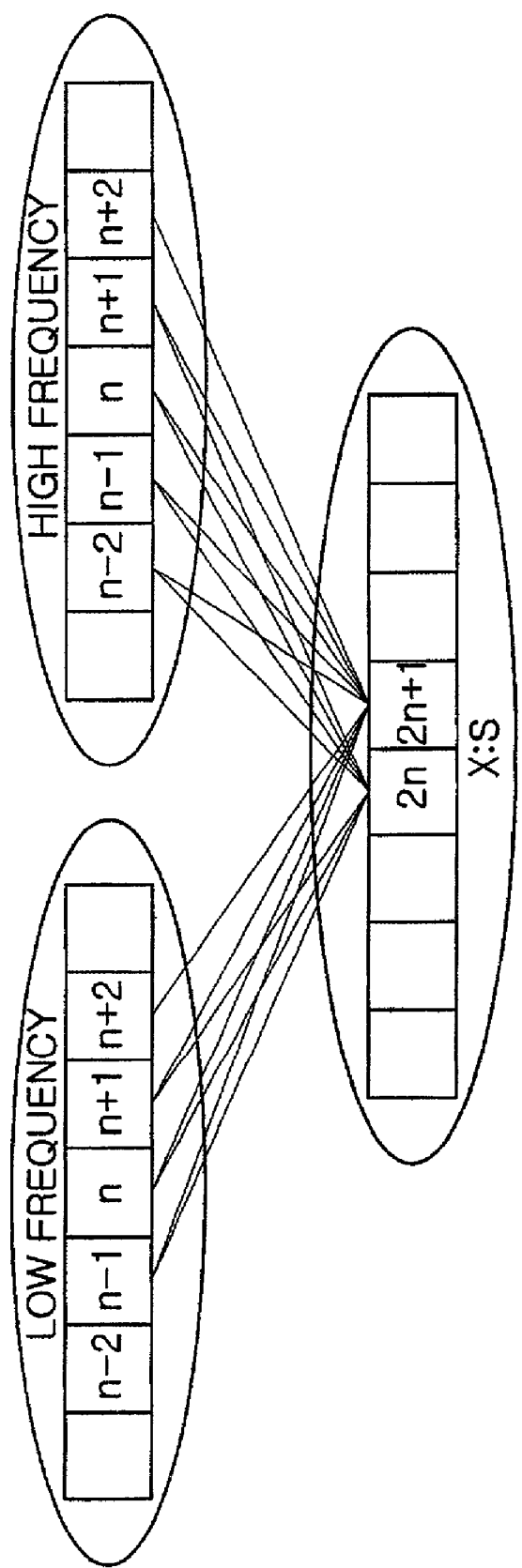
FIG. 4 is a view illustrating construction of low level coefficients using a 9/7 wavelet filter according to the present invention.

The region of interest coefficient is formed using coefficients of one step higher level low frequency and high frequency signal bandwidth. FIG. 4 illustrates one example.

FIG. 4 is a view illustrating higher level coefficients needed for forming lower level coefficients using a generally used 9/7-tap wavelet filter. Here, in order to restore "x(2n)" of a signal of a low level high resolution, "l(n−1), l(n), l(n+1)" which are low frequency signal band width coefficients of a high level low resolution and "h(n−2), h(n−1), h(n) and h(n+1)" which are high frequency signal bandwidth coefficients are needed. In a similar method, in order to restore x(2n+1), "l(n−1), l(n), l(n+1), l(n+2)" which are high level low frequency signals, and "h(n−2), h(n−1), h(n), h(n+1), h(n+2)" which are high level high frequency signals are needed.

In a conventional coding method of a region of interest, it is determined whether a coefficient belonging to the LIP and a coefficient separated from the LIS are coefficients of a region of interest. If the coefficient is a region of interest coefficient, coding operation is performed in the same path as the known SPIHT algorithm such as a significance test. In addition, when separating the LIS, the significance test is performed irrespective of whether the region of interest coefficient is included in the LIS. It should be noted that if the LIS does not include at least one coefficient of the region of interest, it is not needed to perform the significance test. Therefore, it needs to be checked whether the region of interest coefficient is included in the LIS. It is difficult to perform this check with only the region of interest mask. In the present invention, a new mask and a new data structure are disclosed to express whether a region of interest coefficient is included in a descendent of a certain coefficient.

The region of interest mask has the same size as the image. This new mask is defined only with respect to a coefficient having a descendent. An ancestor mask A of the region of interest may be expressed with respect to each coordinate (i,j) in the following equation (3).

$$A(i, j) = \begin{cases} 1 & \text{if } \exists (k, l) \in D(i, j) \text{ and } m(k, l) = 1 \\ 0 & \text{otherwise} \end{cases} \quad (3)$$

here, m(k,l) is the same as defined in the equation (2), and D(i,j) is expressed in the same manner as used in the SPIHT algorithm. A parent mask (P) of the region of interest is defined with respect to each coordinate (i,j) in the following equation (4).

$$P(i, j) = \bigvee_{(k,l) \in O(i,j)} m(k, l) \quad (4)$$

Here, V represents OR logic operation of corresponding values (m(k,l)).

Figure 5:
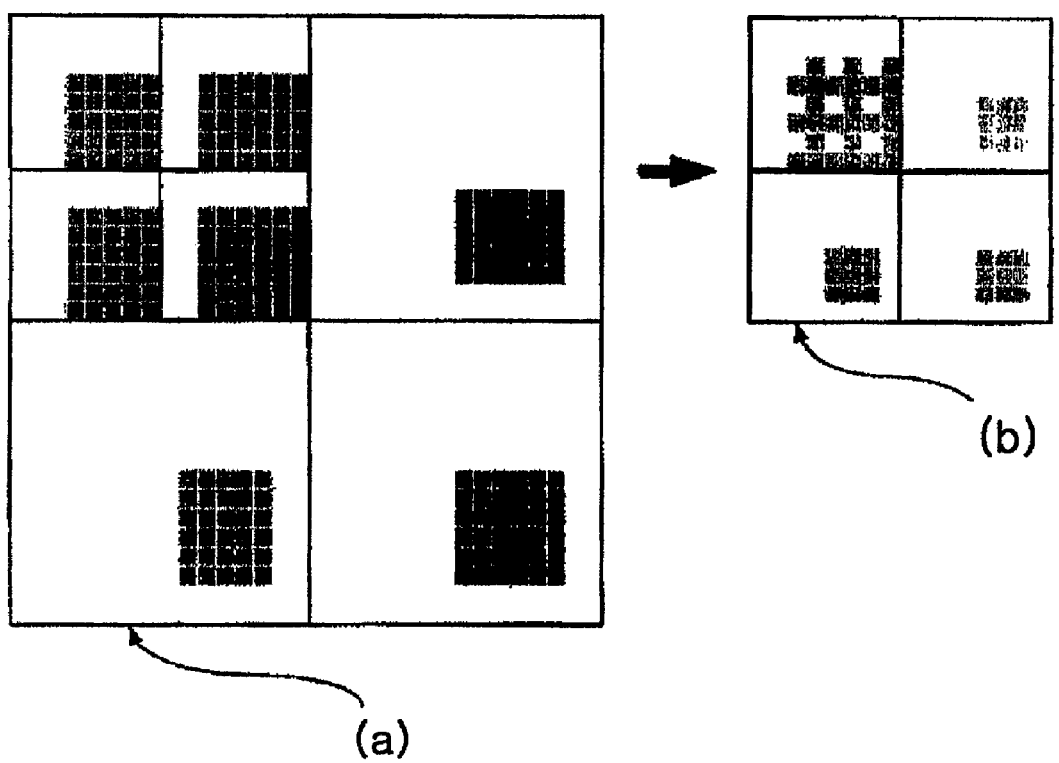
FIG. 5 is a view illustrating a region of interest mask and a parent mask according to the present invention.

The values A(i,j) and P(i,j) of the equations (3) and (4) have the same value. Because the length of a filter used in the process for obtaining a region of interest coefficient in a region of interest is larger than "1", the region of support is widened. Therefore, it is possible to judge whether a region of interest coefficient is included in the descendent using only the parent mask of the region of interest. Namely, if the value P(i,j) is "0", all descendents of (i,j) are not relevant to the region of interest. FIG. 5 is a view illustrating a parent mask of a region of interest formed based on the equation (4).

In FIG. 5, figure (a) is a view illustrating a region of interest mask, and the black rectangles represent the positions of the region of interest coefficients. In addition, figure (b) is a view illustrating the construction of a region of interest parent mask formed based on the equation (3) or (4).

In the conventional coding method of the region of interest, since only the region of interest coefficients are bit-shifted, and then an image is entirely coded, it is not needed to divide the LIP, LIS and LSP. However, in the present invention, an image is divided and coded with respect to a region of interest, and then the compensation coding operation is performed. Therefore, it is divided into the lists which are related to the region of interest and the lists which are not related to the region of interest. When the region of interest coding operation is started, the existing LIP, LIS and LSP are determined as a list related to the region of interest. The lists irrelevant to the region of interest are formed as the NLIP, NLIS, NLSP. The region of interest coding method according to the present invention will be explained using the region of interest mask, region of interest parent mask and newly defined lists.

It is tested whether a coefficient included in the LIP is a region of interest coefficient using the region of interest mask, and the significance test is performed only with respect to the coefficients which passed the test. The coefficients which are in the LIP and are not related to the region of interest are moved to the NLIP. The region of interest parent mask test is performed with respect to the entry included in the LIS before the significance test is performed. If a coefficient does not pass the above test, it is moved to the NLIS. Only when the coefficient is passed, the significance test is performed. If the coefficient passes the significance test, the entry of the LIS is divided. When the entry is divided, a coefficient is belonged to the NLIP, LIP or LSP based on the region of interest. A set of the coefficients is divided into the NLIS and LIS. When the coding operation is completed with respect to the region of interest, the NLIS performs a significance test during the compensation coding operation. Therefore, a sorting operation is performed with respect to a region of interest based on the above operations. Therefore, it is possible to perform a significance test more efficiently and avoid unnecessary region of interest test in the above sorting operation according to the present invention.

When a threshold value is determined, the sorting operation is performed. An improving operation is then performed with respect to the threshold value. When the region of interest coding operation is started, in the first improving process the significant coefficients, except for the region of interest coefficients, among the coefficients included in the LSP are moved to the NLSP. If the LSP is not separated, although it would be possible in the region of interest coding process to test whether a coefficient is a region of interest coefficient and to output the result information, it is impossible to determine up to what bit plane the result information is outputted in the compensation coding stage after the region of interest coding is completed. Therefore, the information is transferred according to the bit plane with respect to the coefficient of the LSP after the NLSP is separated.

Figure 6A:
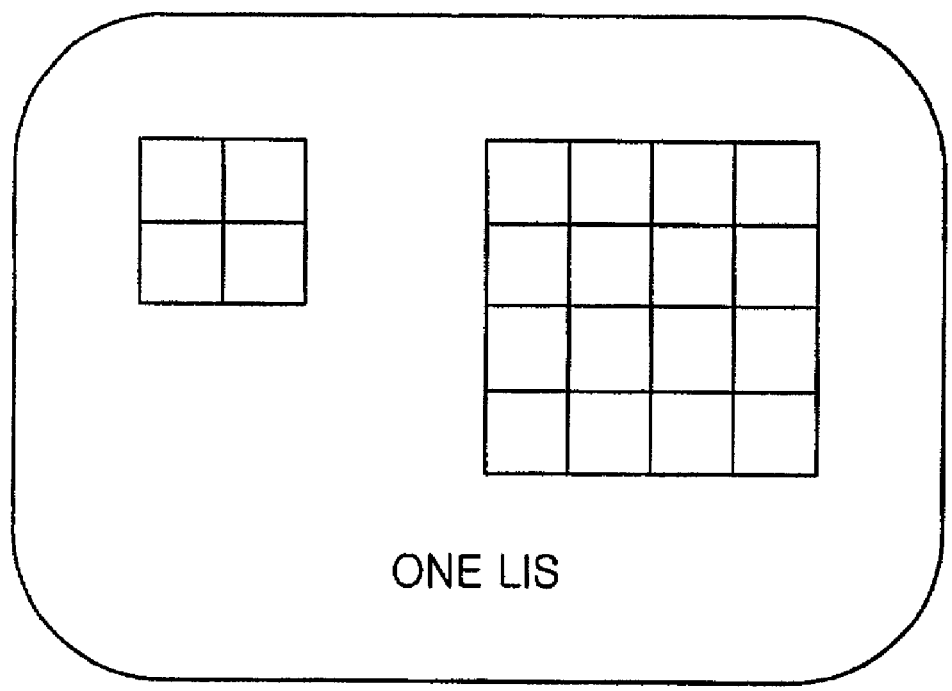
FIGS. 6A and 6B are views for explaining a sorting method of wavelet transform coefficients based on a threshold value according to the present invention.
Figure 6B:
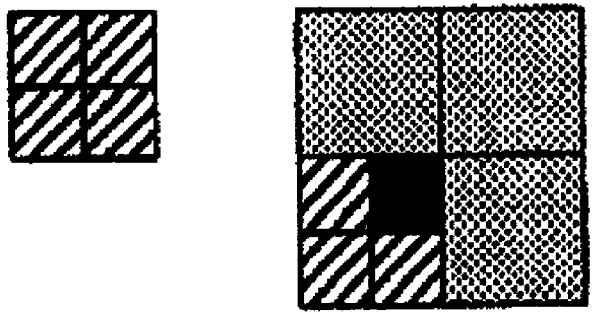

When considering only the coding of the region of interest, the list may be divided into three kinds related to the region of interest and three kinds which are not related to the region of interest. However, in the compensation coding stage after the coding of the region of interest is performed, the following matter should be considered. Namely, in the SPIHT algorithm, when it is registered in the LIP, it is impossible to decrease the bits. However, in the case that the threshold value is lowered based on the region of interest coding operation, the LIP separated from the LIS is increased. In this case, in the compensation coding stage, a certain entry of the NLIP and NLIS may be subject to the significance test. For example, as shown in FIG. 6A, in the case that the threshold value (Th) is "$2^n$" in the region of interest coding operation, it is united in one LIS, and as shown in FIG. 6B, in the case that the threshold value (Th) is "$2^{n-1}$", it is assumed that there are four insignificant coefficients in the same level, three insignificant sets in a lower level, and one significant coefficient. If the above coefficients are related with the region of interest, as shown in FIG. 6A, in the case that the threshold value (Th) is "$2^n$", a significant test bit occurs with respect to one LIS. In addition, as shown in FIG. 6B, in the case that the threshold value is "$2^{n-1}$", significant test bits of 11 bits and a sign relating bit of one bit occur. In this state, in the compensation coding process, the threshold value becomes "$2^n$". In this case, there is no coefficient which is above the threshold value. The significance test should be performed with respect to each entry included in the LIP and LIS. At this time, unnecessary bits occur. If it is known that the coefficients in the LIP are moved to the LIP in a certain threshold value during the region of interest coding operation, when performing the compensation coding operation, it is possible to perform a significance test from the threshold value for thereby decreasing the amount of bits. Therefore, the above matter may be applied to the LIS as well as the LIP. This is accomplished by dividing the LIP and LIS into multiple parts.

In the region of interest coding operation, when the threshold value (Th=$2^k$) is determined, the coefficients moved into the LIP and LIS by the threshold value are divided by LIP(k) and LIS(k). In the compensation coding operation, in the case that the threshold value (Th) is "$2^k$", the significance test is not performed with respect to the LIP(1) and LIS(1) having the value of "1" less than "k". The above method is directed to decreasing the amount of bits which occur with respect to the LIP(1) and LIS(1). The operation for dividing the LIP and LIS into two kinds is a particular case in dividing into multiple LIP and LIS. FIG. 7 is a view illustrating an algorithm for a SPIHT-based region of interest coding method according to the present invention.

As described above, a SPIHT-based region of interest coding method according to the present invention can effectively perform a coding operation of a region of interest using a region of interest mask and a parent mask of a region of interest, so that more bits are allocated with respect to a region of interest, and then it is possible to obtain a quick compression and restoration operation. In addition, the coding method can effectively transfer image under a very narrow bandwidth and an interactive environment, which may be adapted to a remote medical image process.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for coding a wavelet-transformed image using a SPIHT (Set Partional in Hierarchical Tree) algorithm, comprising the steps of:
   (a) compressing wavelet transform coefficients using the SPIHT algorithm;
   (b) coding coefficients and a set of coefficients related to a region of interest up to a bit plane defined by a user;
   (c) performing compensation-coding with respect to coefficients and a set of coefficients excluded from the step (b); and
   (d) compressing coefficients of remaining bit plane using the SPIHT algorithm,
   wherein in the step (b), new list (NLSP) is formed using coefficients except for region of interest coefficients among coefficients included in a list (LSP) of significant coefficients faormed based on the SPIHT algorithm, and coefficients which are not related with the region of interest included in the list (NLSP) are excluded from the region of interest coding operation.

2. The coding method of claim 1, wherein the region of interest is designated by a decoder.

3. The coding method of claim 1, wherein in the step (b), to determine whether coefficients are related to the region of interest, an ancestor mask (A) of the region of interest is defined as follows:

$$A(i, j) = \begin{cases} 1 & \text{if } \exists (k, l) \in D(i, j) \text{ and } m(k, l) = 1 \\ 0 & \text{otherwise} \end{cases}$$

where D(i,j) represents a set of all descendent coordinates of coordinate (i,j), (i,j) represents a coordinate after an wavelet transform is performed, m(k,l) represents a region of interest coefficient and is "1" when d(k,l)≠0 and is otherwise "0", and d(k,l) represents a discrete wavelet transform coefficient, which transform is performed recursively to a low frequency band of an image based an FDWTN{r(u,v)}.

4. The coding method of claim 3, wherein in the step (b), when the ancestor mask of the region of interest has value "0", all descendents of the coordinate (i,j) are determined as coefficients not related to the region of interest.

5. The coding method of claim 4, wherein in the step (b), coefficients are separated according to each bit plane using a list (LIS) of insignificant coefficient set and a list (LIP) of insignificant coefficients which are formed based on the SPIHT algorithm and are registered to a LIS and LIP corresponding to each bit plane with respect to an entry entering the LIS and LIP on each separated bit plane.

6. The coding method of claim 4, wherein in the step (c), a coding operation is performed to a bit plane determined by a user using the NLSP and the separated LIS and LIP.

7. The coding method of claim 6, wherein when the compensation coding operation is completed, in the step (c), the LSP and the NLSP are combined, and the separated LIS and LIP are united to one LIS and LIP, to be compressed by an allowable bit amount.

8. The coding method of claim 5, wherein in the step (c), a coding operation is performed to a bit plane determined by a user using the NLSP and the separated LIS and LIP.

9. The coding method of claim 8, wherein when the compensation coding operation is completed, in the step (c), the LSP and the NLSP are combined, and the separated LIS and LIP are united to one LIS and LIP, to be compressed by an allowable bit amount.

10. The coding method of claim 1, wherein in the step (b), to determine whether coefficients are related to the region of interest, a parent mask (P) of the region of interest is defined as follows:

$$P(i, j) = \underset{(k,l) \in O(i,j)}{V} m(k, l)$$

where V represents OR logic operation of corresponding values (m(k,l)),

O(i,j) represents a set of direct descendent coordinates of coordinate (i,j) wherein (i,j) represents a coordinate after a wavelet transform is performed, m(k,l) represents a region of interest coefficient and is "1" when d(k,l)≠0 and otherwise "0", and d(k,l) represents a discrete wavelet transform coefficient, which transform is performed recursively to a low frequency band of an image based on FDWTN{r(u,v)}.

11. The coding method of claim 10, wherein in the step (b), when the parent mask of the region of interest has value "0", all descendents of the coordinate (i,j) are determined as coefficients not related the region of interest.

12. The coding method of claim 11, wherein in the step (b), coefficients are separated according to each bit plane using a list (LIS) of insignificant coefficient set and a list (LIP) of insignificant coefficients which are formed, based on the SPIHT algorithm end is registered to the LIS and LIP corresponding to each bit plane with respect to an entry entering into the LIS and LIP on each separated bit plane.

13. The coding method of claim 12, wherein said step (b) comprises the sub-steps of:
   (b1) testing whether coefficients belong to the region of interest, using each region of interest mask with respect to the coefficients included in the LIP and an entry included in the LIS;
   (b2) testing whether coefficients belong to the region of interest, using the region of interest parent mask wit respect to an entry included in the LIS which passed the test of the step (b1);
   (b3) performing a significance test with respect to the coefficients included in the LIP which passes the test of the step (b1) and an entry included in the LIS which passed the test of the step (b2) and forming new lists (NLIP, NLIS) with respect to the coefficients which did not pass the test and the entry; and
   (b4) dividing the entry of the LIS which passed the significance test of the step (b3) and entering the coefficients of the entry into a NLIP, LIP and LSP according to a region of interest or a region of non-interest and dividing the set of the coefficient into the NLIS and LIS.

14. The coding method of claim 12, wherein in the step (c), a coding operation is performed to a bit plane determined by a user using the NLSP and the separated LIS and LIP.

15. The coding method of claim 14, wherein when the compensation coding operation is completed, in the step (c), the LSP and the NLSP are combined, and the separated LIS and LIP are united to one LIS and LIP, to be compressed by an allowable bit amount.

16. The coding method of claim 11, wherein in the step (c), a coding operation is performed to a bit plane determined by a user using the NLSP and the separated LIS and LIP.

17. The coding method of claim 16, wherein when the compensation coding operation is completed, in the step (c), the LSP and the NLSP are combined, and the separated LIS and LIP are united to one LIS and LIP, to be compressed by an allowable bit amount.

* * * * *